US011301941B2

(12) United States Patent
Kandhway et al.

(10) Patent No.: US 11,301,941 B2
(45) Date of Patent: Apr. 12, 2022

(54) SYSTEMS AND METHODS FOR OPTIMIZING INCENTIVES FOR DEMAND RESPONSE

(71) Applicant: Tata Consultancy Services Limited, Mumbai (IN)

(72) Inventors: Kundan Kandhway, Chennai (IN); Arunchandar Vasan, Chennai (IN); Srinarayana Nagarathinam, Chennai (IN); Venkatesh Sarangan, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 637 days.

(21) Appl. No.: 15/804,337

(22) Filed: Nov. 6, 2017

(65) Prior Publication Data

US 2018/0357730 A1 Dec. 13, 2018

(30) Foreign Application Priority Data

Jun. 12, 2017 (IN) .............................. 201721020446

(51) Int. Cl.
*G06Q 50/06* (2012.01)
*G06Q 30/02* (2012.01)
(Continued)

(52) U.S. Cl.
CPC ............. *G06Q 50/06* (2013.01); *G06F 30/13* (2020.01); *G06Q 30/0276* (2013.01); *G06F 2119/08* (2020.01)

(58) Field of Classification Search
CPC .................................................... G06Q 50/06
(Continued)

(56) References Cited

U.S. PATENT DOCUMENTS 8,600,561 B1\* 12/2013 Modi ..................... G05D 23/19
700/276
8,880,232 B2 11/2014 Parsons
(Continued)

FOREIGN PATENT DOCUMENTS

CN 103679357 3/2014

OTHER PUBLICATIONS

Lu Lu et, al. ("Global Optimization for overal HVAC systems—Part I, Energy Conversion and Management 46 (2005) 999-1014, hereinafter Lu") (Year: 2005).*

(Continued)

*Primary Examiner* — Emmett K. Walsh
(74) *Attorney, Agent, or Firm* — Finnegan, Henderson, Farabow, Garrett & Dunner, LLP

(57) ABSTRACT

Electrical utilities offer incentives to customers to reduce consumption during periods of demand-supply mismatch. A building's participation in demand response (DR) depends both on its ability (due to building constraints), and its willingness (a function of incentive) to reduce electricity. Customers prefer a large incentive whereas a utility would want to minimize the revenue outflow to achieve a target reduction. Systems and methods of the present disclosure identify optimal incentive from the utility's perspective reflecting this trade-off. A model is built to estimate the demand response potential (DRP) of a building for a given incentive offered by the utility. The models for individual buildings are used to characterize the behavior of an ensemble of buildings. The utility may then decide optimum incentives that should be offered to achieve a target DR, using the associated DRP.

11 Claims, 15 Drawing Sheets

(51) Int. Cl.
*G06F 30/13* (2020.01)
*G06F 119/08* (2020.01)

(58) Field of Classification Search
USPC ........................................ 705/14.72
See application file for complete search history.

(56) References Cited

U.S. PATENT DOCUMENTS

| | | |
|---|---|---|
| 2012/0016524 A1 | 1/2012 | Spicer et al. |
| 2012/0310860 A1* | 12/2012 | Kim ............... G06Q 30/08 705/412 |
| 2014/0277769 A1* | 9/2014 | Matsuoka ......... G05D 23/1905 700/278 |
| 2015/0330645 A1 | 11/2015 | Speranzon et al. |
| 2016/0091904 A1 | 3/2016 | Horesh et al. |
| 2017/0052536 A1* | 2/2017 | Warner ............... G06Q 50/06 |

OTHER PUBLICATIONS

Li et al., "Review of building energy modeling for control and operation", Renewable and Sustainable Energy Reviews 37 (2014) 517-537 (Year: 2014).*

* cited by examiner

SYSTEMS AND METHODS FOR OPTIMIZING INCENTIVES FOR DEMAND RESPONSE

PRIORITY CLAIM

This U.S. patent application claims priority under 35 U.S.C. § 119 to: Indian Patent Application No. 201721020446, filed on Jun. 12, 2017. The entire contents of the aforementioned application are incorporated herein by reference.

TECHNICAL FIELD

The embodiments herein generally relate to energy consumption in facilities, and more particularly to systems and methods for optimizing incentives for demand response.

BACKGROUND

Electrical utilities offer incentives to their customers to reduce their demand during periodic supply-demand mismatches. For a building facility manager, the ability to participate in Demand Response (DR) is determined by the building's constraints, while the willingness depends upon the incentive offered. While customers would prefer a higher incentive to participate, utilities would prefer to minimize the incentive while achieving a target reduction. Because the incentive affects the bottom line of the utility, identifying an optimal incentive reflecting this trade-off is important. Traditionally, how to implement DR in a building has been largely addressed. However, utilities face a challenge in identifying optimal incentive that can be offered for a set of buildings that it serves, while meeting individual buildings' constraints.

SUMMARY

Embodiments of the present disclosure present technological improvements as solutions to one or more of the above-mentioned technical problems recognized by the inventors in conventional systems.

In an aspect, there is provided a processor implemented method comprising: estimating a demand response potential (DRP) of a facility constituting one or more buildings, for a given tariff structure and demand response (DR) incentive from a utility based on (i) a baseline energy consumption (E*) associated with cost optimal operation of the facility with no DR and (ii) energy consumption ($E_{DR}$*) of the facility with DR; and determining optimal incentive for the facility based on the estimated DRP.

In another aspect, there is provided a system comprising: one or more data storage devices operatively coupled to the one or more processors and configured to store instructions configured for execution by the one or more processors to: estimate a demand response potential (DRP) of a facility constituting one or more buildings, for a given tariff structure and demand response (DR) incentive from a utility based on (i) a baseline energy consumption (E*) associated with cost optimal operation of the facility with no DR and (ii) energy consumption ($E_{DR}$*) of the facility with DR; and determine optimal incentive for the facility based on the estimated DRP.

In yet another aspect, there is provided a computer program product comprising a non-transitory computer readable medium having a computer readable program embodied therein, wherein the computer readable program, when executed on a computing device, causes the computing device to: estimate a demand response potential (DRP) of a facility constituting one or more buildings, for a given tariff structure and demand response (DR) incentive from a utility based on (i) a baseline energy consumption (E*) associated with cost optimal operation of the facility with no DR and (ii) energy consumption ($E_{DR}$*) of the facility with DR; and determine optimal incentive for the facility based on the estimated DRP.

In an embodiment of the present disclosure, wherein the baseline energy consumption (E*) and the energy consumption ($E_{DR}$*) of the facility with DR are based on a cost criteria and a plurality of constraints.

In an embodiment of the present disclosure, wherein the cost criteria and the plurality of constraints are based on (i) a dynamic thermal model of the facility to predict temperature evolution given the ambient conditions, internal heat loads and building envelope parameters; (ii) a Heating Ventilation and Air Conditioning (HVAC) model for Air Handling Unit (AHU) fan and chiller unit given the fan mass flow rate and total cooling load respectively; and (iii) systemic inertia in HVAC equipment.

In an embodiment of the present disclosure, wherein the cost criteria for the baseline energy consumption (E*) is associated with total HVAC energy consumption due to AHU fan and chillers and is a function of AHU fan speed for a given time period; and the cost criteria for the energy consumption ($E_{DR}$*) of the facility with DR is associated with reduction in energy consumption from the baseline energy consumption based on the incentive from the utility and the total HVAC energy consumption associated thereof.

In an embodiment of the present disclosure, wherein the plurality of constraints are associated with maximum AHU flow rate, thermal comfort requirement, maximum available chiller capacity and temperature evolutions, wherein the temperature evolutions for given ambient conditions, internal heat loads and building envelope parameters are predicted by the dynamic thermal model.

In an embodiment of the present disclosure, the one or more hardware processors are further configured to determine the optimal incentive for the facility by performing one of:

(i) for the event that uniform incentive is to be assigned to the buildings constituting the facility:
  computing aggregate reduction for the facility based on the estimated DRP of the buildings for each possible value of incentive; and
  selecting lowest incentive from the utility that achieves a target aggregate reduction for the utility; or (ii) for the event that non-uniform incentive is to be assigned to the buildings constituting the facility:
  computing aggregated incentive from the utility as a weighted summation of the estimated DRP of the buildings; and
  adjusting the incentives such that the aggregated incentive is minimized and the estimated DRP is at least the target aggregate reduction for the utility.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which.

Figure 1:
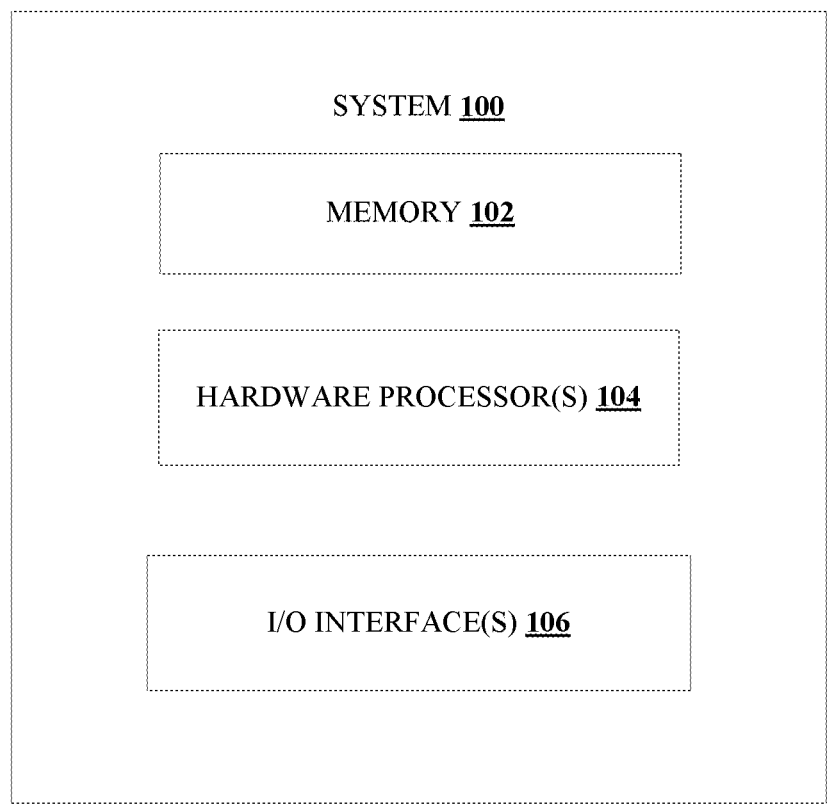
FIG. 1 illustrates an exemplary block diagram of a system for optimizing incentives for demand response (DR), in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

Electricity utilities offer monetary incentives to customers to reduce load during temporary demand-supply mismatch. This is referred to as demand response (DR). Existing methods for deciding monetary incentive to commercial buildings for demand response events do not account for building constraints (e.g. indoor temperature that building needs to maintain for occupant comfort). There is also lack of literature on how an electricity utility can estimate demand response potential of a building or an ensemble of buildings. Demand response potential is the energy consumption reduced by a building during a demand response event with respect to the baseline consumption. It is a challenge for electricity utilities to plan incentives for a building or an ensemble of buildings; deciding on whether to allot equal or varying incentives for each building, building type or class. Systems and methods of the present disclosure build Demand-Response Potential (DRP) models that use an economically rational demand reduction of a building as a function of the utility's offered incentive.

Considering DR from a utility's perspective: In a typical demand event, a utility may have exhausted its cheaper supplies to meet the demand and may need to tap external wholesale supply. However, because of regulatory or contractual obligations, the utility typically does not have the pricing power to pass on the peak price to its customers even with time-of-day or peak pricing. Instead of procuring power at the peak marginal cost, the utility may pay its customers an incentive to reduce their demands so that the total demand stays within the utility's cheaper supply capacity. While the utility loses revenue due to offering an incentive in addition to reducing the demand, it is still better than the cost of serving the (no-DR) higher peak demand. Thus the utility can benefit from DR and from the utility's perspective, the incentive should be low enough to just meet the targeted demand reduction.

Considering DR from a facility's perspective: The motivating desiderata for DR participation are favorable economics, automated convenience and continued control (facility manager) of the facility's electrical loads. While automation and control are important, the final managerial decision to participate in DR and invest (if need be) in technologies such as batteries, automation, grid interfaces, etc. may essentially be driven by the economics. The key factor determining the economic decision making, in turn, is the incentive offered by the utility. Thus a building can benefit from DR and from a building's perspective, the incentive should be high enough to make it worthwhile to participate in DR.

The trade-off: While buildings and the utility both have a case for DR, their objectives conflict. The utility needs to choose the incentive (unless a customer is big enough to have pricing power), to achieve the desired demand reduction while accounting for the constraints stemming from the buildings' perspective. Because the incentive affects the bottom-line of the utility, identifying the optimum incentive which may ensure a target DR reduction for the utility is an important problem.

Of the factors influencing participation by a facility, identifying the optimal incentive from the utility's perspective that captures the trade-off between the conflicting building and utility perspectives has been addressed by systems and methods of the present disclosure.

The expression "Demand Response Potential (DRP)" in the context of the given disclosure refers to energy consumption reduced by a facility during a demand response (DR) event.

The expression "facility" in the context of the given disclosure refers to one or more buildings and may be used interchangeably.

The expression "incentive" in the context of the given disclosure refers to cost to be paid by a utility per unit of reduced energy consumption.

The choice of optimum incentive by the utility depends on the participating facility's ability and willingness to cut demand in response to an incentive. The ability of a building to do DR depends on its demands, constraints, electrical equipment mix, systemic inertia, and so on. Assuming that the building facility manager does not have any prejudices, for a given incentive from the utility, she would reduce the energy consumption during DR to the point of maximum economic returns while satisfying the building's operational requirements. The DR Potential (DRP) of a building is thus a function of the set of the physical and user-required constraints (ability) and the incentive offered (willingness). In accordance with the present disclosure, once the DRPs of various buildings served by a utility are known as functions of the incentive offered, for a given utility-level target reduction, the utility may obtain the optimum incentive.

While there are many knobs to perform DR such as lighting, batteries, renewables, etc., the present disclosure focuses on Heating Ventilation and Air Conditioning (HVAC) system operation for the following reasons. Firstly, unlike newer technologies like batteries and integrated renewables that may or may not be available in a building, HVAC is a mandatory part of a modern building. Using HVAC for DR is an operational decision rather than a capital expenditure decision. So this knob would be first considered by almost all facility managers. Secondly, the HVAC systems account for 35% of energy consumed in a typical building. Finally, literature shows HVAC to be the best candidate for DR. The building constraints that are considered in the present disclosure are those that pertain to the HVAC systems, namely thermal comfort requirements of the building occupants. The thermal comfort, in turn depends on: (i) the thermal inertia of the building, and (ii) the systemic inertia in the HVAC equipment. The above inertia can be significant in a building. Due to this inertia, HVAC load can be shifted away from the DR periods by doing additional work during non-DR period. Therefore, while the energy consumed may be higher than usual, the economic cost can come down.

The DRP model of the present disclosure factors energy-cost trade-off in addition to accounting for time-variations in ambient and internal heat loads. For a given incentive, the DRP model of the present disclosure outputs energy reduction during the DR period under rational operation. Further, the DRP model of the present disclosure is rich in terms of parameters to capture different types of buildings (e.g., schools, offices, warehouses, etc.).

The DRP of a building depends on the ability of the building to shift some of the thermal load away from the DR time window subject to maintaining acceptable thermal comfort. The thermal comfort is a strong function of the indoor air temperature prevalent in the building. The indoor temperature in turn determines the cooling load, and hence the DRP through HVAC system's energy consumption. Thus, to quantify DRP, the present disclosure models both the building's indoor air temperature evolution and HVAC system performance over time. To this end, the present disclosure uses (i) a dynamic thermal model of the building to predict temperature evolution given the ambient conditions, internal heat loads and building envelope parameters; (ii) HVAC system models for both the Air Handling Unit (AHU) fan and chiller unit given the fan mass flow rate and total cooling load; and (iii) systemic inertia in HVAC equipment respectively.

Thermal model of the building: In accordance with the present disclosure, temperature is considered to be an indicator for thermal comfort and a thermal model is used to predict indoor air temperature evolution. Thermal model for a facility having one building, wherein the building has a single thermal zone and is served by one AHU and one chiller may be represented as follows—

Building indoor air temperature dynamics is largely driven by: (1) the ambient heat entering the space through the building envelop (side walls and roof); and (2) internal heat loads resulting from occupants and other sources such as computing and lighting. The present disclosure uses lumped capacitance models for tracking the evolution of the indoor air temperature and building envelope interior surface temperatures. Table 1 herein below defines notations used in the present disclosure.

TABLE 1

Notations

| | Symbol | Meaning | Symbol | Meaning |
|---|---|---|---|---|
| Heat load model | $\dot{m}$ | Flow-rate of AHU (kg/s) | $q_g$ | Internal heat gain (W) |
| | t | Time (s) | $A_i$ | Area of wall i ($m^2$) |
| | C | Air thermal capacitance (J/K) | $C_p$ | Specific heat capacity of air (J/kg/K) |
| | T | Indoor air temperature (° C.) | $C_{w_i}$ | Thermal capacitance of wall i (J/K) |
| | $T_{sup}$ | Supply air temperature (° C.) | $T_a$ | Ambient temperature (° C.) |
| | $U_i$ | Overall heat transfer coefficient of wall i ($W/m^2$-K) | $T_{w_i}$ | Temperature of wall i (° C.) |
| HVAC operation | $t_{start}$ | HVAC operation start time(s) | $t_{end}$ | HVAC operation end time(s) |
| | $t_{start}^{DR}$ | DR start time(s) | $t_{end}^{DR}$ | DR end time(s) |
| | $t_{start}^{c}$ | Occupancy start time(s) | | |
| | $\dot{m}_{min}$ | Minimum AHU flow rate | $\dot{m}_{max}$ | Rated AHU flow rate |
| | $T_{min}$ | Minimum acceptable comfort temperature | $T_{max}$ | Maximum acceptable comfort temperature |
| | $Q_L$ | Cooling load (W) | $Q_{avail}$ | Available chiller capacity (W) |

TABLE 1-continued

Notations

| | Symbol | Meaning | Symbol | Meaning |
|---|---|---|---|---|
| Energy and cost | $C_T$ | Total cost of HVAC operation ($) | $E_{HVAC}$ | Total HVAC energy consumption (kWh) |
| | p(t) | Time-of-day electricity tariff ($) | v | DR incentive ($) |
| | E* | Energy consumed in DR period in baseline operation | $E^*_{DR}$ | Energy consumed in DR period in DR program |

Using the notations defined in Table 1, the thermal model may be expressed as follows:

$$\frac{dT^t}{dt} = \frac{1}{C}\left[\dot{m}C_p(T_{sup} - T^t) + q_g^t + \sum_{i=1}^{5} U_i A_i (T_{w_i}^t - T^t)\right] \quad (1a)$$

$$\frac{dT_{w_i}^t}{dt} = \frac{1}{C_{w_i}}[U_i A_i (T^T - T_{w_i}^t) + U_i A_i (T_a^t - T_{w_i}^t)] \quad (1b)$$

Heating Ventilation and Air Conditioning (HVAC) model: The main purpose of HVAC is to condition indoor air for meeting the thermal comfort requirements. In the process HVAC rejects heat to a medium such as ambient air or water. Typically for large-medium buildings this is achieved through a combination of Air Handling Unit (AHU) and chiller units, while for small buildings and residential housings, Direct Expansion (DX) units may suffice. The present disclosure mainly addresses large-medium buildings, and accordingly models for AHU fan and chiller power consumption.

AHU power: A standard physics based model for AHU fan power is used: $P_{fan} = k\dot{m}^3$. Here, k is a constant that depends on the rated fan static pressure rise, rated mass flow rate and overall efficiency of the fan motor.

Chiller power: The power consumed by a chiller is normally a function of the cooling load, leaving chilled water temperature, and condenser entering air/water temperature (for air/water cooled chillers). The cooling load, in turn, is a function of the mass flow rate of air across the AHU cooling coils and the supply air temperature. Given these parameters, the power consumed by the chiller power can be obtained from manufacturer's system power models. Alternatively, in the absence of such information, the typical approaches to obtain power consumed by a chiller are based on thermodynamics models and regression based models. In accordance with the present disclosure, regression based chiller models are used for the various building types.

Systemic inertia in HVAC equipment: In addition to the indoor air and building envelope thermal inertia (accounted for in Equations 1a and 1b respectively), HVAC systems, especially chillers, inherently have inertia. Chillers take some time to achieve the (chilled) leaving water set-point or fully loaded state after being switched on. Typically this time may vary anywhere from 10 mins to 30 mins, depending on the chiller size and leaving water set-point. The system inertia may affect DRP and occupant comfort, if a chiller undergoes ON-OFF transition within or just ahead of a DR time window. However, under normal operations, system inertial effects and DR window are typically well separated in time. The DR events are advertised by a utility on hotter days, and the DR window usually aligns with the ambient peaks which happen well into a day's afternoons. On the other hand, chillers are turned on typically at the beginning of a day and they remain on until the end of day. On account of the time gap between a day's beginning (around 8:00 AM) and afternoon peak (around 1:30-3:30 PM), the inertial effects of chillers are ignored. Furthermore, the present disclosure considers only cooling season although the methodology is applicable to heating mode with and without gas heating.

Data for model generation: The utility may develop building and HVAC models for various buildings in its service area to estimate the buildings' DRP. When buildings enroll for DR programs with a utility, they provide the utility with details about their load structure. Further, energy professionals may visit the buildings to understand them better before enrolling them in DR programs. As a part of such surveys and site-visits, information pertaining to building envelope details, HVAC design parameter and performance curves, and historical logs of the parameter of interest may be collected to develop the models. The utility may also use standards such as ISO 52016 for reducing complexity of the building model for simulating approximate incentive strategy. It may be noted that collecting data pertaining to a building's models is a one-time activity and does not need to be repeated frequently.

Model generalization: It may be noted that assumptions made in developing the thermal comfort and HVAC models can be relaxed in real-world scenarios. For instance, in a given geography, it is typical for a building to have similar set-points across the building's conditioned spaces, especially for comfort HVAC applications (the other application type being process industry). In such instances, the complexity of a building with multiple thermal zones can be reduced to a single thermal zone. This may help the utility to develop an approximate DRP model for a building. In addition to multiple thermal zones, a building may also have multiple AHUs servings these zones. Again, it is likely that a building has similarly sized AHUs with similar performance curves. Data pertaining to these AHUs can also be gathered when a building enrolls for the DR program. For the thermal comfort model of a building with n AHUs, the n individual AHUs can be aggregated to be a single large AHU. The large AHU can then be considered to serve the single large zone (which is the entire space inside the building shell). Under one AHU, one zone configuration, the appropriate flow rate $\dot{m}(t)$ values that maintains the thermal comfort within the large zone is computed. After obtaining the flow rate, the flow is equally apportioned among the n AHUs. In the HVAC power models, a flow rate of $\dot{m}(t)/n$ is used for each of the AHUs and their individual power curves to obtain the overall AHU power. Reducing multiple chillers of similar type to a single chiller is relatively straight forward since the equation involves only the total cooling load, irrespective of the number of AHUs. A single chiller may be assumed by clubbing together the rated capacities of the individual chillers with a single similar performance curve (or single averaged performance curve).

Referring now to the drawings, and more particularly to FIGS. 1 through 12, where similar reference characters denote corresponding features consistently throughout the figures, there are shown preferred embodiments and these embodiments are described in the context of the following exemplary system and method.

FIG. 1 illustrates an exemplary block diagram of a system 100 for optimizing incentives for demand response (DR), in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
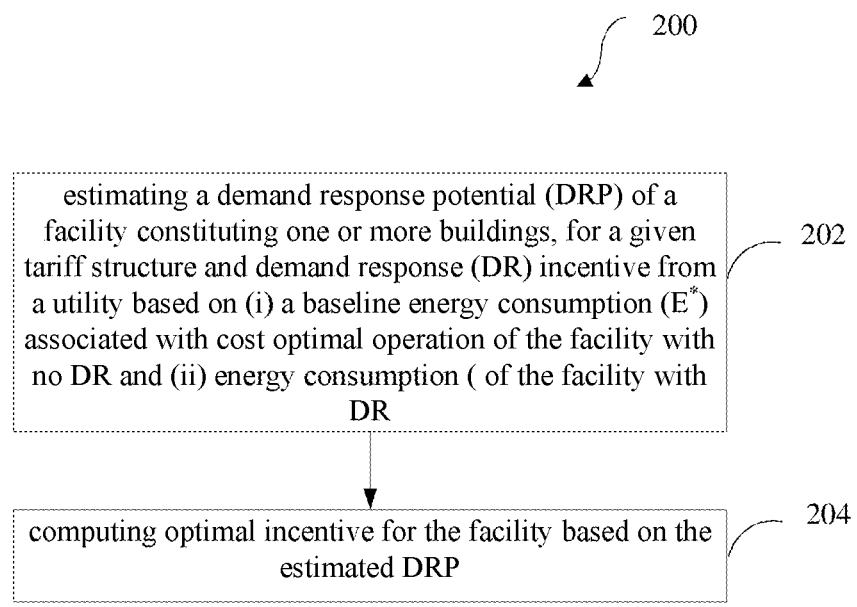
FIG. 2 is an exemplary flow diagram illustrating a computer implemented method for optimizing incentives for demand response (DR), in accordance with an embodiment of the present disclosure.

FIG. 2 is an exemplary flow diagram illustrating a computer implemented method 200 for optimizing incentives for demand response (DR), in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104.

Figure 3:
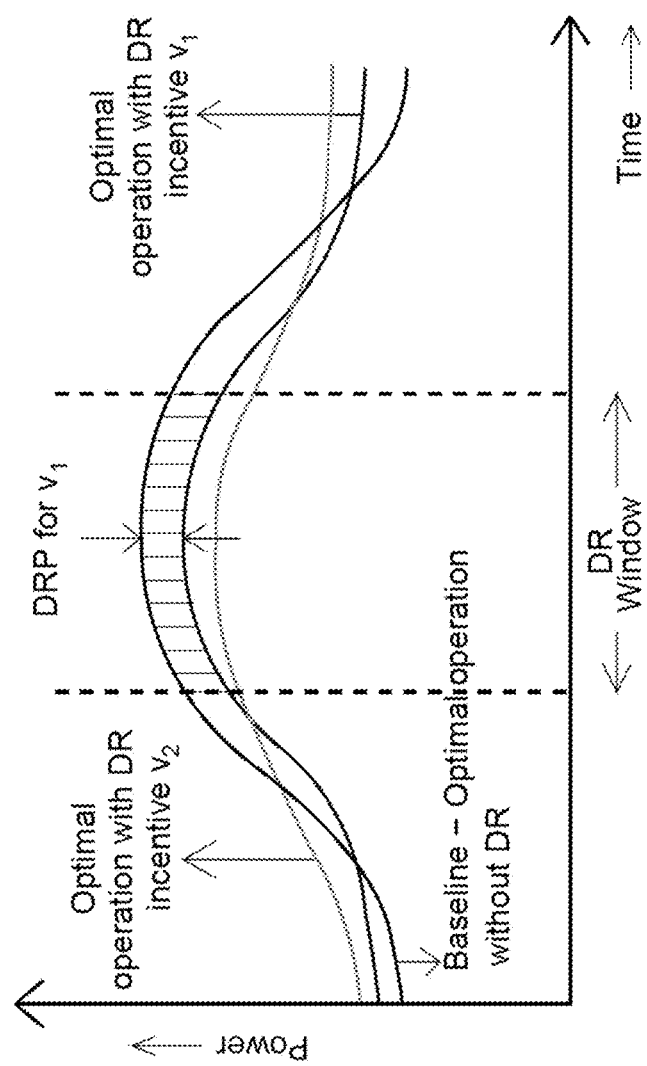
FIG. 3 illustrates Demand Response Potential (DRP) of a building, in accordance with an embodiment of the present disclosure.

Cost optimal operation of a building with no DR is considered as a fair baseline; and energy reduction with respect to this optimal baseline is obtained during the DR period. This energy reduction is referred to as the DR potential of a building. Accordingly, in accordance with an embodiment of the present disclosure, the one or more processors 104 are configured to estimate, at step 202, a demand response potential (DRP) of a facility constituting one or more buildings, for a given tariff structure and demand response (DR) incentive from a utility based on (i) a baseline energy consumption (E*) associated with cost optimal operation of the facility with no DR and (ii) energy consumption ($E_{DR}$*) of the facility with DR. FIG. 3 illustrates Demand Response Potential (DRP) of a building, in accordance with an embodiment of the present disclosure.

Figure 4:
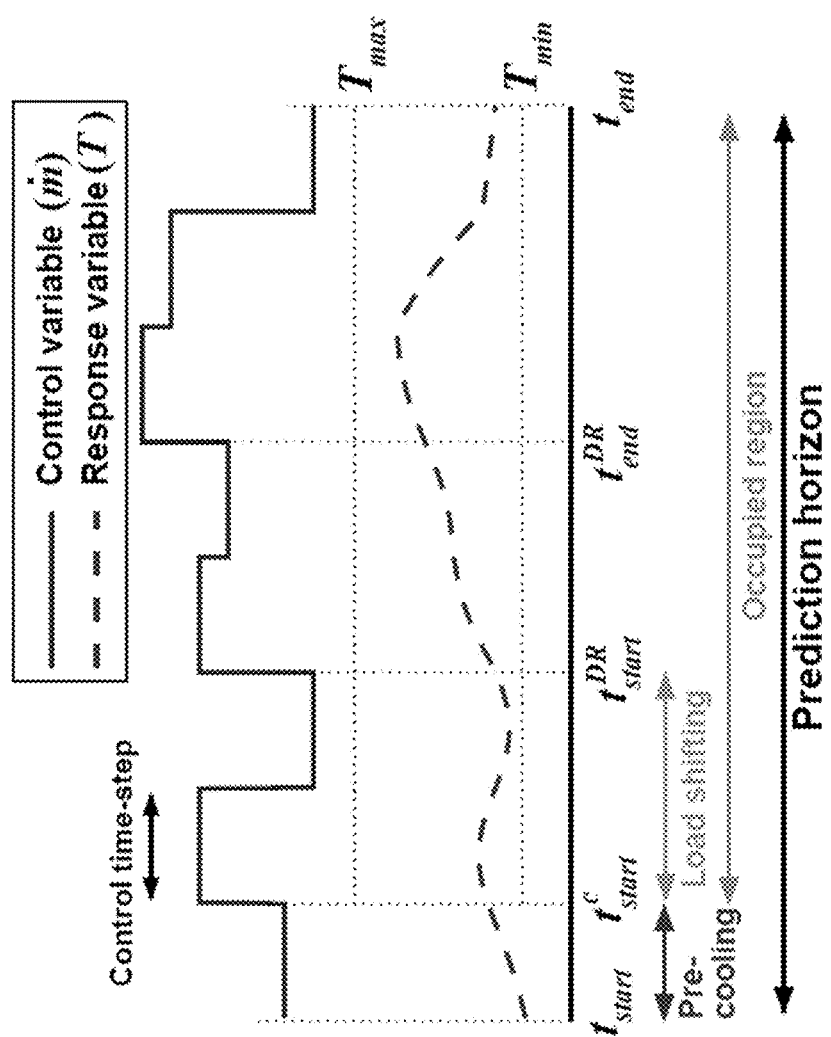
FIG. 4 illustrates an exemplary representation of Heating Ventilation and Air Conditioning (HVAC) operation time line as known in the art.

A building's rational operational behavior aims to minimize the total cost of energy consumption under a given tariff structure and DR incentive, while maintaining an acceptable thermal comfort. FIG. 4 illustrates an exemplary representation of Heating Ventilation and Air Conditioning (HVAC) operation time line as known in the art. FIG. 4 shows the DR event time window in a given day between $t_{start}^{DR}$ and $t_{end}^{DR}$. Let $E_{DR}$* and E* be the energy consumed by a building b in the time window $[t_{start}^{DR}, t_{end}^{DR}]$ when it is operating rationally with and without DR respectively. Then the DRP of the building b is defined as:

$$DRP(b) = E^* - E_{DR}^* \qquad \rightarrow (2)$$

When expressed as a percentage, the DRP is defined as:

$$DRP(b) = \left(\frac{E^* - E_{DR}^*}{E^*}\right) \times 100 \qquad (3)$$

The percentage formulation is useful when comparing across buildings of different types, sizes, and so on. The present disclosure facilitates developing an optimization model that allows a utility to estimate the values of $E_{DR}$* and E* for a given building under a specific tariff structure and DR incentive. The thermal comfort and HVAC models described herein above are leveraged in conjunction with a predictive approach to estimate a building's DRP.

Let $C_T$ be the total monetary cost of energy consumed over the time horizon $[t_{start} - t_{end}]$. The optimization problem that results in a rational building operation may be stated as follows:

$$\min_{\dot{m}} C_T = \int_{t_{start}}^{t_{end}} p(t) \cdot E_{HVAC}(\dot{m}(t)) \qquad (4)$$

subject to the following constraints
1. The AHU flow rate is bounded between the rated capacity and some min flow rate such as minimum ventilation requirement to maintain air quality.

$$\dot{m}_{min} \leq \dot{m}(t) \leq \dot{m}_{max}, \forall t \qquad \rightarrow (5)$$

2. Thermal comfort requirement: indoor air temperature is bounded.

$$T_{min} \leq T \leq T_{max}, t \in [t_{start}^c, t_{end}] \qquad \rightarrow (6)$$

3. At any point in time, the cooling load cannot exceed the maximum available chiller capacity.

$$Q_L^t \leq Q_{avail}^t, \forall t \qquad \rightarrow (7)$$

The available capacity is generally a function of leaving water temperature, condenser fluid temperature and rated capacity.
4. Indoor air temperature and building interior surface temperature evolutions as per $$\text{Equations (1a) and (1b)} \qquad \rightarrow (8)$$

In Equation (4), $E_{HVAC}$ is the total HVAC energy consumption due to both AHU fan and chillers. It is a function of the AHU fan speed $\dot{m}(t)$; p(t) refers to the cost of per unit of electricity at time t. Equations (1a) and (1b) form a system of equation solved using standard Runge-Kutta technique. The optimization problem (Equations 4-8) is solved using a standard non-linear constrained optimization technique. The control time-step is fixed at 10 mins, while the prediction horizon $[t_{start} - t_{end}]$ corresponds to the building's operational hours. The operational hours and comfort bounds for a building can be collected during the DR enrollment survey that many utilities have.

Let $\dot{m}(t)$ be the solution for the optimization problem specified in Equation 4. Now $E^*$ may be obtained as $$E^* = \int_{t_{start}^{DR}}^{t_{end}^{DR}} E_{HVAC(\dot{m}^*(t))} \qquad (9)$$

wherein equation (4) serves as the cost criteria and equations (5) through (8) serve as the plurality of constraints.

Energy consumption with DR ($E_{DR}^*$): In the presence of a DR signal, the building will be offered an incentive of \$v for every kWh it reduces from the baseline consumption in the DR period. The optimization problem that governs the economically rational behavior with a DR incentive can be stated as:

$$\min_{\dot{m}} C_T = \int_{t_{start}}^{t_{end}} p(t) \cdot E_{HVAC}(\dot{m}(t)) - v\left(E^* - \int_{t_{start}^{DR}}^{t_{end}^{DR}} E_{HVAC(\dot{m}(t))}\right) \qquad (10)$$

along with the constraints stated in Equations 5-8. Let $\dot{m}_{DR}^*(t)$ be the solution for the optimization problem specified in Equation 10. Now, $E_{DR}^*$ can be obtained as $$E_{DR}^* = \int_{t_{start}^{DR}}^{t_{end}^{DR}} E_{HVAC}(\dot{m}_{DR}^*(t)) \qquad (11)$$

wherein equation (10) serves as the cost criteria and equations (5) through (8) serve as the plurality of constraints.

From these expressions for $E^*$ and $E_{DR}^*$, the DRP of a building can be calculated using Equation (2) or (3) for a given incentive v and price tariff p(t). Thus, in accordance with the present disclosure, the baseline energy consumption ($E^*$) and the energy consumption ($E_{DR}^*$) of the facility with DR are based on a cost criteria and a plurality of constraints, wherein the cost criteria and the plurality of constraints are based on (i) a dynamic thermal model of the facility to predict temperature evolution given the ambient conditions, internal heat loads and building envelope parameters; (ii) a Heating Ventilation and Air Conditioning (HVAC) model for Air Handling Unit (AHU) fan and chiller unit given the fan mass flow rate and total cooling load respectively; and (iii) systemic inertia in HVAC equipment. Furthermore, the cost criteria for the baseline energy consumption ($E^*$) is associated with total HVAC energy consumption due to AHU fan and chillers and is a function of AHU fan speed for a given time period; and the cost criteria for the energy consumption ($E_{DR}^*$) of the facility with DR is associated with reduction in energy consumption from the baseline energy consumption based on the incentive from the utility and the total HVAC energy consumption associated thereof. Again, the plurality of constraints are associated with maximum AHU flow rate, thermal comfort requirement, maximum available chiller capacity and temperature evolutions, wherein the temperature evolutions for given ambient conditions, internal heat loads and building envelope parameters are predicted by a dynamic thermal model.

Incentive design for targeted reduction: Given a target demand reduction in a DR interval, a utility needs to identify the optimal incentive to achieve reduction across a facility served by it. In accordance with the present disclosure, the one or more processors 104 are configured to compute, at step 204, the optimal incentive for the facility based on the estimated DRP. As explained earlier, the parameters required for calibrating the DRP model of each building can be obtained at the time of enrolling these buildings in the DR program. The present disclosure addresses determining optimum incentive under two scenarios: (a) the same incentive is offered across the buildings constituting the facility and (b) varying incentives are offered across the buildings constituting the facility, wherein the buildings constituting the facility may be of different types as well.

Uniform incentive: For the scenario wherein uniform incentive is to be assigned to the buildings constituting the facility, the one or more processors 104 are configured to compute aggregate reduction for the facility based on the estimated DRP of the buildings; and select lowest incentive from the utility that achieves a target aggregate reduction for the utility. The determining of uniform incentive may be outlined as shown herein below.

---

GET-INCENTIVE-UNIFORM ($R_T$, B, V)
    $R_T \leftarrow$ target reduction
    V $\leftarrow$ set of incentive values; B $\leftarrow$ set of buildings
1    for each incentive v $\in$ V
2        do R(V) $\leftarrow$ 0
            ▷ R(v) reduction for set of buildings
3        for each building b $\in$ B
4            do $DRP_b(v) \leftarrow$ Reduction in b for incentive v
5                $R(v) \leftarrow R(v) + DRP_b(v)$
6    Find min v such that $R(v) \geq R_T$

---

Accordingly, the DRP of the buildings constituting the facility is computed for each possible value of incentive in lines 1 through 5. In line 6, the lowest incentive which achieves the target reduction is identified.

For a building b, the $DRP_b(V)$ is a non-decreasing function of v. Because R(v), the total reduction, is the sum of non-decreasing functions of v, it is also a non-decreasing function of v. For a given target reduction $R_T$, the revenue loss is minimized by identifying the smallest v for which the target reduction constraint is met.

Non-uniform incentive: For the scenario wherein non-uniform incentive is to be assigned to the buildings constituting the facility, the one or more processors 104 are configured to compute aggregated incentive from the utility as a weighted summation of the estimated DRP of the buildings; and adjust the incentives such that the aggregated incentive is minimized and the estimated DRP is at least the target aggregate reduction for the utility. The determining of non-uniform incentive may be outlined as shown herein below.

---

GET-INCENTIVE-NON-UNIFORM ($R_T$, B, V)
    $R_T \leftarrow$ target reduction
    V $\leftarrow$ set of incentive values; B $\leftarrow$ set of buildings
1    for each incentive v $\in$ V
2        do for each building b $\in$ B
3            do $DRP_b(v) \leftarrow$ Reduction in b for incentive v
        ▷ Global Optimization
4    Find varying incentives $v_b$ for each
    building b $\in$ B to $\min_v (\Sigma_{b \in B} v_b DRP_b(v_b))$
5    such that $(\Sigma_{b \in B} v_b DRP_b(v_b)) \geq T_R$

---

Accordingly, DRP reduction of each building constituting the facility is computed for various possible incentives in lines 1 through 3 and the optimization problem is solved.

The objective function shown in line 4 is the revenue loss due to the incentives for all the buildings taken together. The decision variables(s) to be searched are the individual incentives v for all buildings. The constraint in line 5 requires that the total reduction in the DR energy consumption due to the choices of the incentives meets the target DR requirement. The global optimization problem is solved using pattern search.

Case Study: DRP for Varying Building Types
The DRP calculation of the present disclosure is applied to varying building types. For each building type, its DRP for varying tariff structures and DR incentives has been considered.

Building types considered: A utility company may serve different kinds of buildings such as small offices, large offices, malls, hospitals, warehouses, etc. According to a database of commercial buildings created by National Energy Renewable Laboratory (NREL), there are roughly fifteen building types representing 70% of all commercial buildings in the US. The types of these buildings (and the identifiers used to refer to the types) are given in Table 2 herein below.

TABLE 2

Commercial building classification by NREL

| Type ID | Type | Number of buildings | Area (in $10^3$ ft$^2$) |
|---|---|---|---|
| 1 | Full service restaurant | 200 | 5.5 |
| 2 | Hospital | 6567 | 241.3 |
| 3 | Large hotels | 241 | 122.1 |
| 4 | Large office | 24305 | 498.6 |
| 5 | Medium office | 34841 | 53.6 |
| 6 | Outpatient health care | 9895 | 40.9 |
| 7 | Primary school | 17628 | 73.6 |
| 8 | Quick service restaurant | 2284 | 2.5 |
| 9 | Secondary school | 2531 | 210.9 |
| 10 | Small hotels | 28753 | 43.2 |
| 11 | Small office | 19517 | 5.5 |
| 12 | Stand-alone retail | 29074 | 25.0 |
| 13 | Strip mall | 29073 | 22.5 |
| 14 | Supermarket | 5589 | 45.0 |
| 15 | Warehouse | 26480 | 52.0 |

The parameters needed for developing the thermal comfort and HVAC models across these fifteen building types are extracted from the library of EnergyPlus™ simulation software. This building energy simulation software is used to model energy consumption in a building for heating, cooling, ventilation and lighting, and other building specific process/plug loads. The building model and parameter values used in the software mimic reality well enough to facilitate qualitative conclusions to hold in the real world, even if the actual numbers may not be the same.

Figure 5:
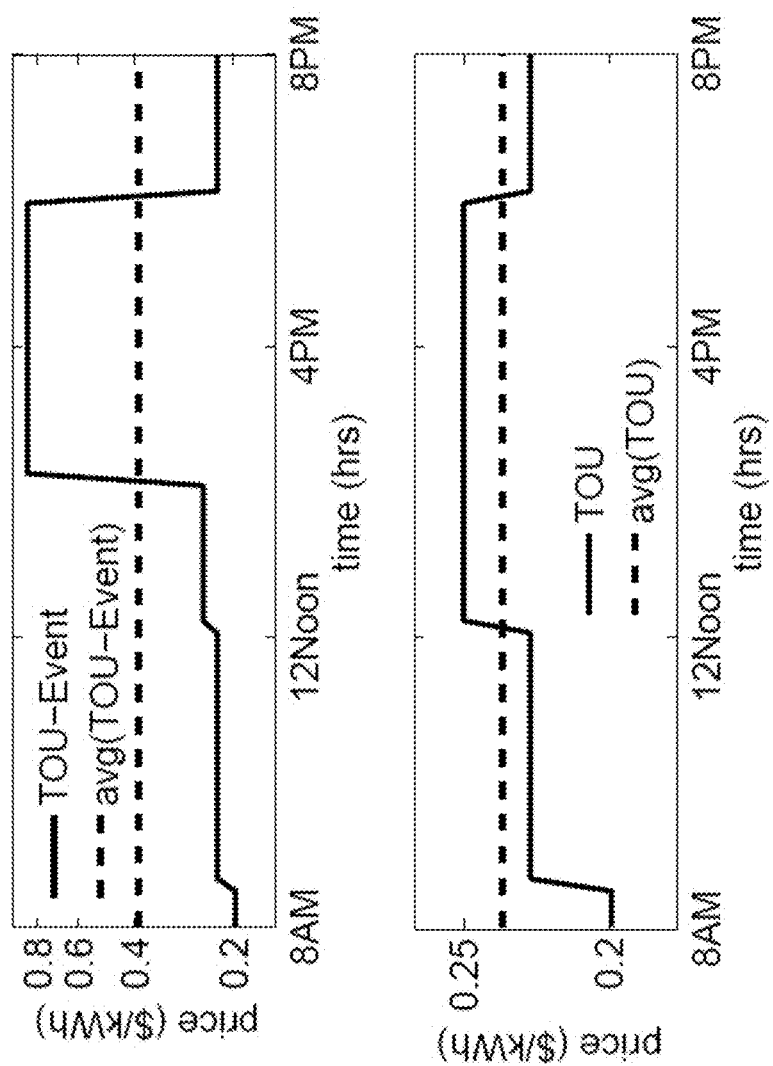
FIG. 5 illustrates an exemplary graphical representation of electricity tariff ($/kWh) versus time of day (hr)

Tariff schemes: To understand the sensitivity of DRP to electricity tariff schemes, four different pricing schemes have been used. FIG. 5 illustrates an exemplary graphical representation of electricity tariff ($/kWh) versus time of day (hr). The profiles TOU (Time-Of-Use) and TOU-Event are time of use based pricing schemes used by a real-world utility {Pacific Gas and Electric (PG&E), during summer and extreme temperature days respectively. The TOU-Event profile has significantly higher max-to-min ratio for the prices across the day. The other two profiles avg(TOU) and avg(TOU-Event) have a constant price throughout the day. They are the time averages of the TOU and TOU-Event profiles respectively.

Figure 6B:
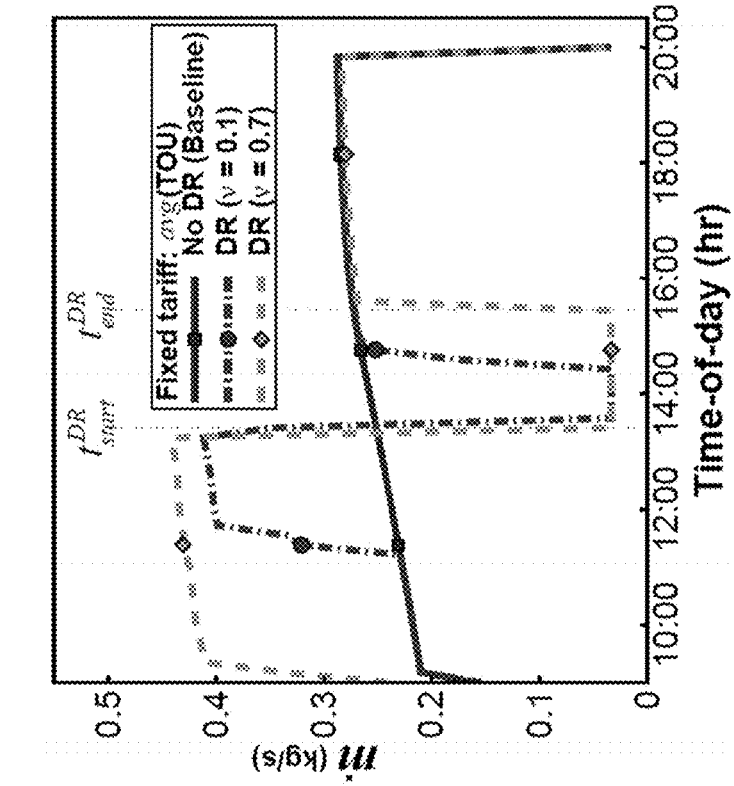
FIG. 6A and FIG. 6B illustrate changes in HVAC operations in an exemplary small-office by which the building trades off electricity consumption in DR and non-DR periods in accordance with an embodiment of the present disclosure.
Figure 6A:
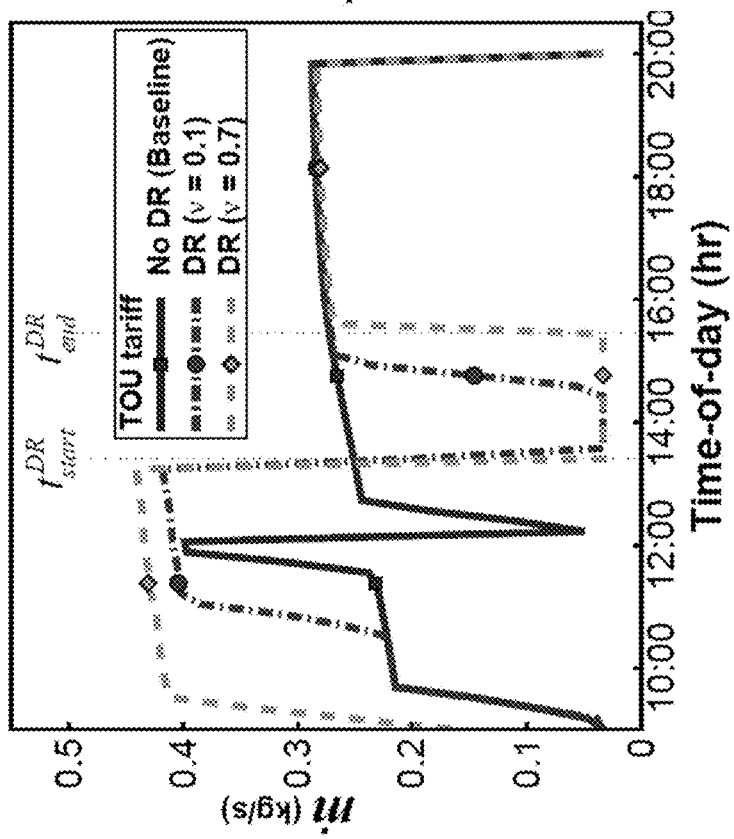
Figure 6C:
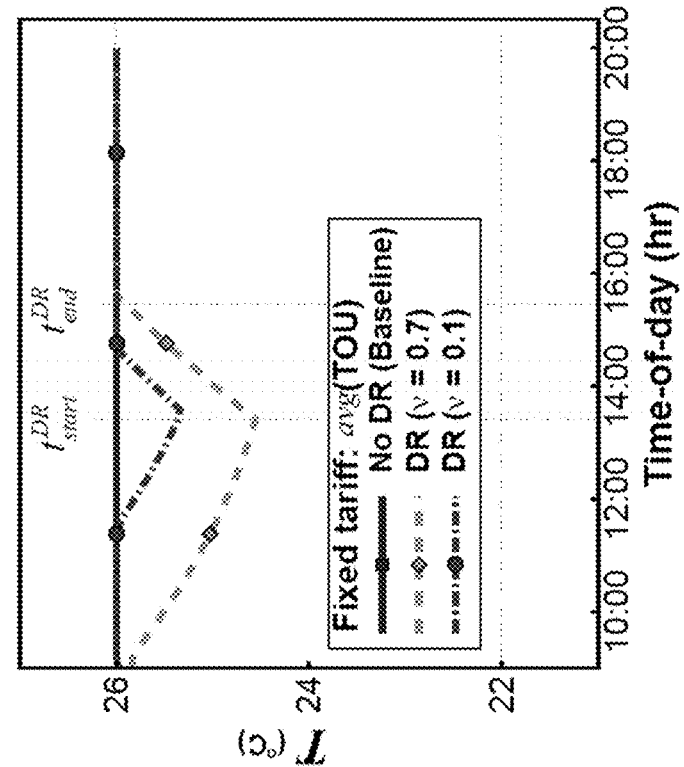
FIG. 6C and FIG. 6D illustrate the building air temperature for the strategies shown in FIG. 6A and FIG. 6B respectively in accordance with an embodiment of the present disclosure.
Figure 6D:
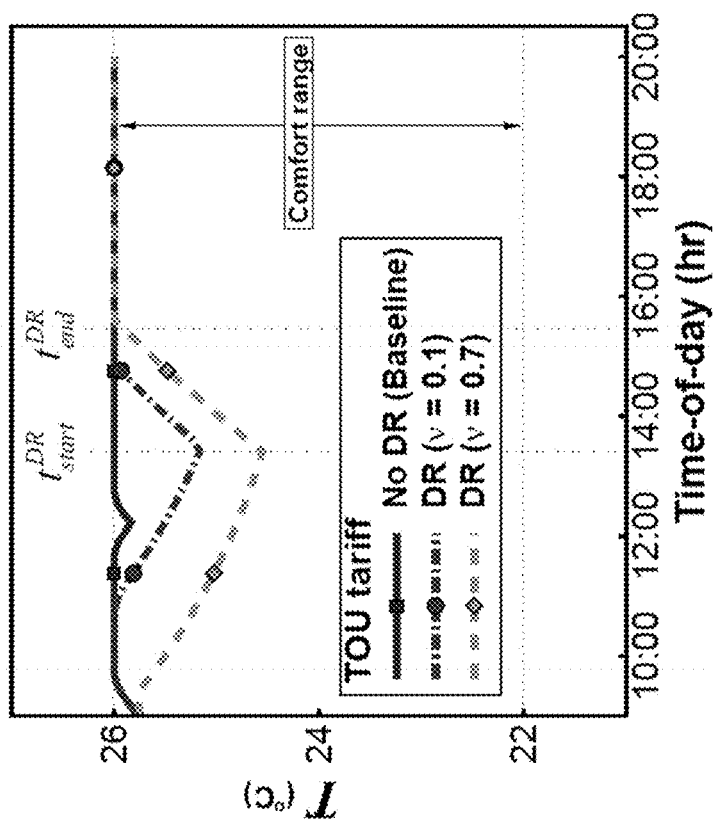

Optimal HVAC operation under DR: Characteristics of the optimal energy consumption profile of a given building type under different DR incentives and pricing schemes are discussed herein. FIG. 6A and FIG. 6B illustrate changes in HVAC operations in an exemplary small-office by which the building trades off electricity consumption in DR and non-DR periods. The incentive during the DR period with respect to the baseline makes it profitable for the building to shift the load from the DR to the non-DR period. Without load shifting, complete/partial switch off of cooling equipment may not be possible due to comfort constraints. Load shifting brings down the temperature (while respecting the lower end of the comfort band). This allows the HVAC to reduce the consumption during the DR period. FIG. 6C and FIG. 6D illustrate the building air temperature for the strategies shown in FIG. 6A and FIG. 6B respectively. The comfort constraint on the temperature (22-26° C.) is met at all occupied times. It is observed that the load shifting duration increases with increase in the DR incentive from $0.05/kWh to $0.7/kWh (and so does DR savings). For the TOU price profile, it is noted that even the baseline (without any DR incentive) exploits the cheaper rate available at around 12 PM by some load shifting.

DRP of different building types: FIG. 7A illustrates the DRP of a few building types under the TOU pricing scheme, as a percentage (Equation 3), i.e., reduction during DR window normalized by the baseline energy during DR window. DRP varies with building type. Some buildings like full and quick service restaurants have very low DRP. High internal heat gain due to kitchens makes shifting the thermal load to other periods difficult. On the other hand, buildings like warehouse and retail shop have relatively low internal heat gain (low process/plug load) leading to high DRP. The DRP of all building types increases with the incentive initially. Beyond a value of the incentive, the DRP saturates. The DRP curve is concave downwards which implies that the marginal increase in energy reduction achieved due to a marginal increase in incentive is diminishing. This suggests that there exists a sweet spot for the utility in terms of the incentive to be offered to buildings to achieve a reduction in the DR period.

Figure 7B:
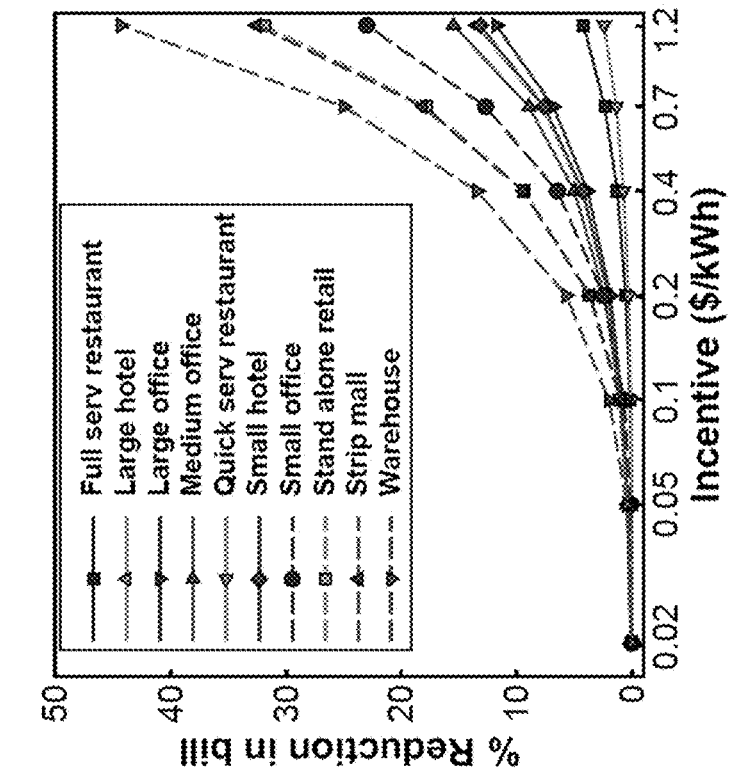
FIG. 7B illustrates the financial gain that various buildings achieve due to participating in the DR program in accordance with an embodiment of the present disclosure.
Figure 7A:
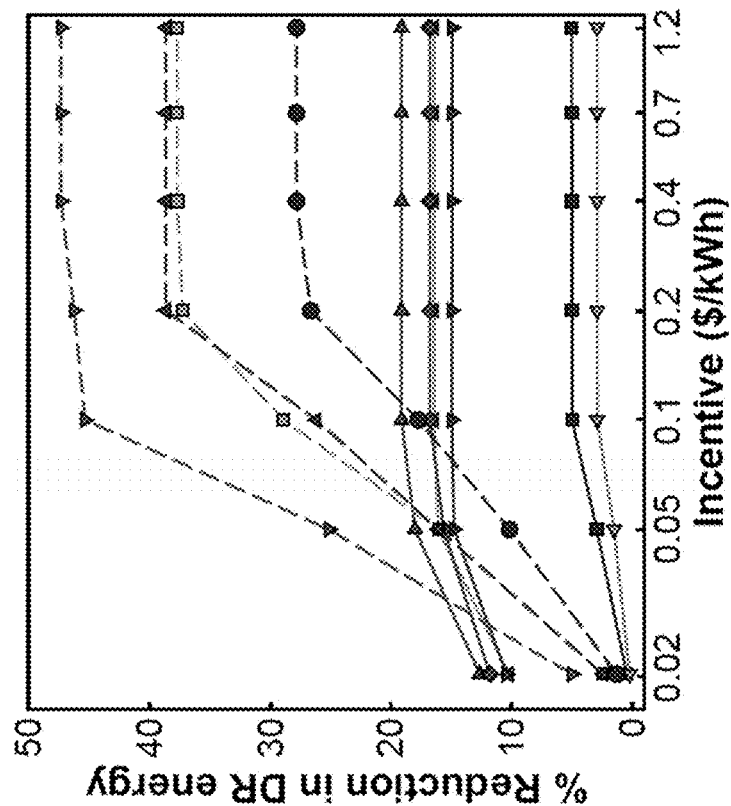
FIG. 7A illustrates the DRP of a few building types under the TOU pricing scheme in accordance with an embodiment of the present disclosure.

FIG. 7B illustrates the financial gain that various buildings achieve due to participating in the DR program. Due to the incentives, the electricity bill reduces by participating in the DR program with respect to the baseline electricity bill; making it rational to participate in the DR program.

Figure 8:
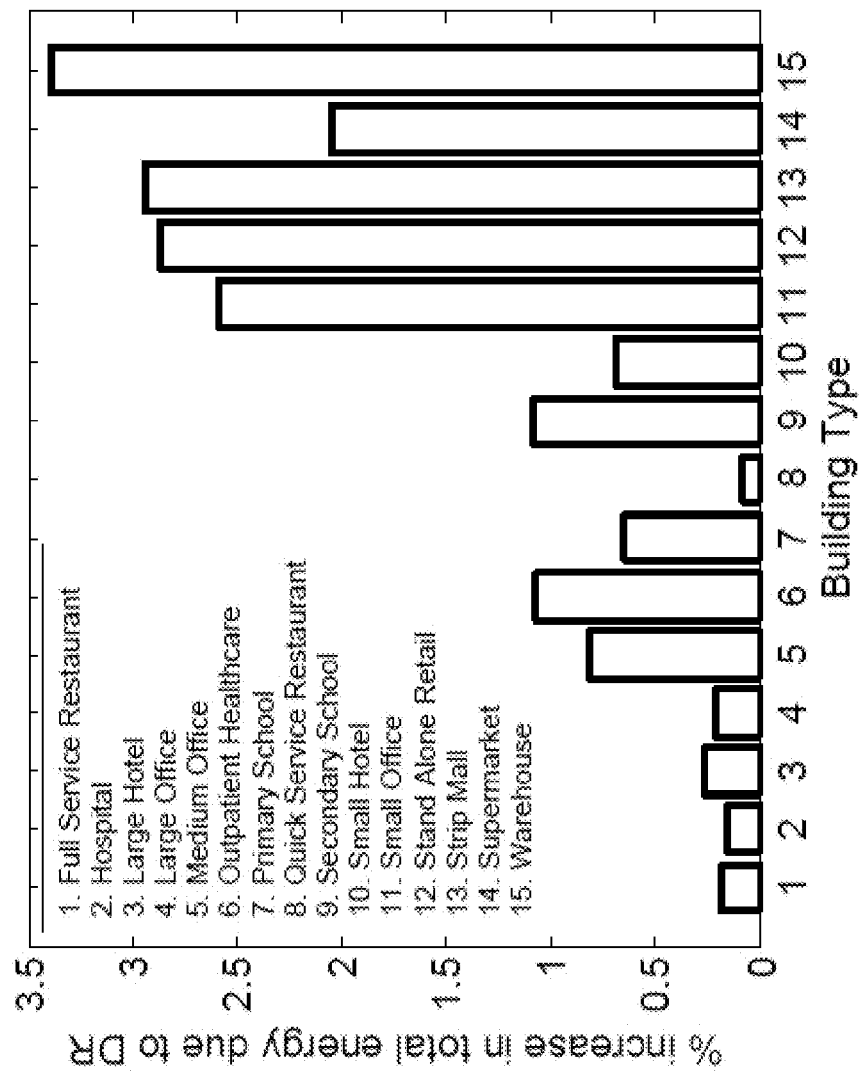
FIG. 8 illustrates % increase in total energy due to DR in accordance with an embodiment of the present disclosure.

Although DR participation is economically profitable, it comes at a cost of increased energy expenditure. If X is the total energy consumed in the baseline operation, more total electricity $X(1+\delta)$ is consumed when participating in the DR program. Load shifting decreases consumption in the DR period, however, more electricity is consumed in the non-DR period. As a result of over-cooling the building to the lower end of comfort temperature range prior to the DR period, the electricity consumption is expected to increase. The extent and duration of the over-cooling shifts the load, depending on building construction material, which otherwise would normally occur during the peak price/DR period. The average $\delta$ across all building types is 1.27% for the price profile TOU and incentive v=$0.7/kWh. FIG. 8 illustrates % increase in total energy due to DR. As demonstrated, the efficiency of buildings in storing coolth (during thermal load shifting from DR to non DR period) varies depending on the size and construction material of the building. For example, for a hospital, $\delta$=0.15%, in contrast, a smaller building, small office, has $\delta$=2.59%. Buildings having higher (lower) DRP in FIG. 7A have higher (lower) values for $\delta$ in FIG. 8.

Higher DRP is achieved through larger quantity of load shifting that is likely to be more inefficient and hence this trend.

Figures 9A, 9B:
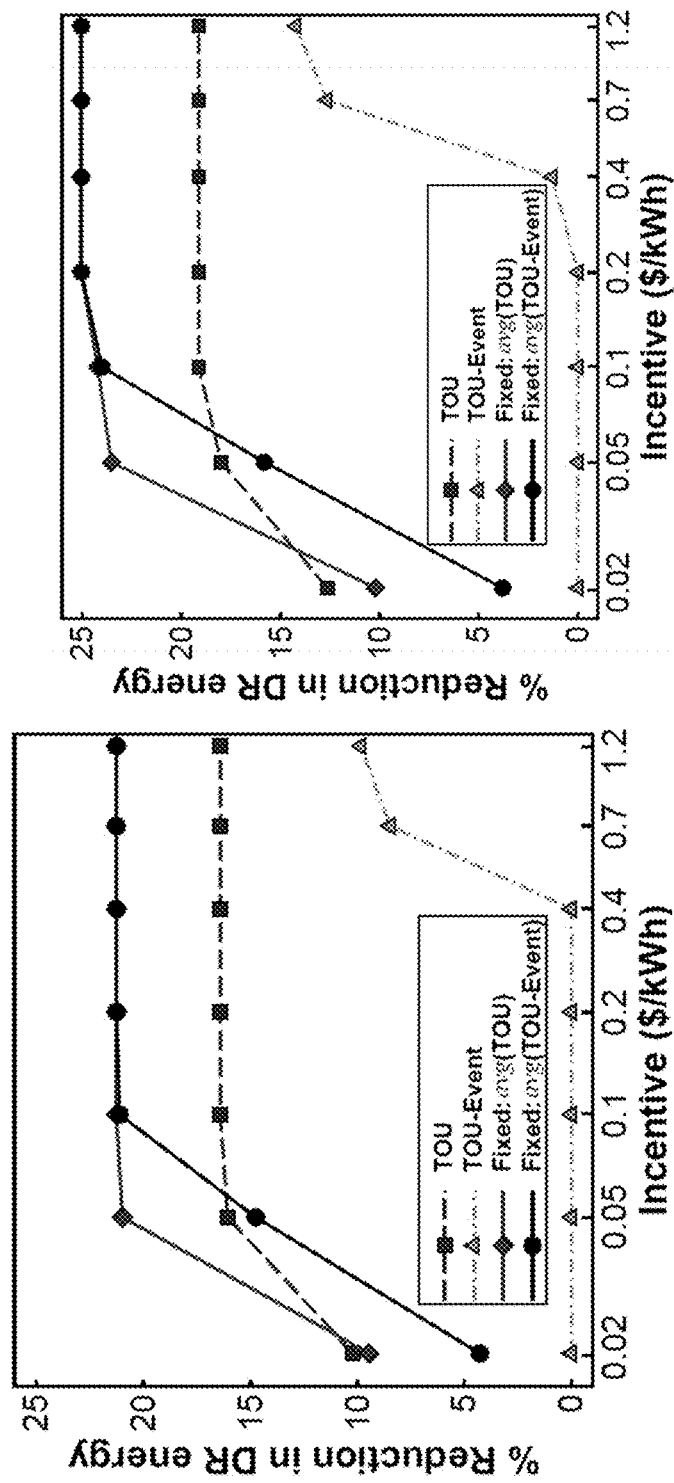
FIG. 9A and FIG. 9B illustrate DRP of two building types under the four different pricing across building types of large hotel and medium office respectively.

DRP under varying pricing schemes: FIG. 9A and FIG. 9B illustrate DRP of two building types under the four different pricing across building types of large hotel and medium office respectively. The X-axis shows the incentive; and the Y-axis, the % reduction in DRP. The highest DRP is observed for constant tariff pricing, with lesser DRP for TOU and TOU-Event pricing schemes. This is because the DR period falls in the time interval when the electricity rate is higher in the price profiles TOU and TOU-Event. In the cost optimal operation that is used as a baseline, the load is shifted away to time intervals where the energy price is lower. In other words, the baseline consumption during the DR period is already less due to the pricing scheme. Reducing it further during an actual DR event (through the offered incentive) is a challenge and may not be feasible due to comfort constraints on the periods of load shifting. Thus, this results in a smaller DRP for TOU profiles compared to constant price. For the same reason, the TOU-Event has a lesser DRP than TOU because the max-to-min ratio in TOU-Event profile is higher than that in TOU. In general, as the max-to-min ratio ("peakiness") in the pricing scheme increases, a building's DRP decreases.

Case Study: Incentive Design

An ensemble of buildings available in PLUTO dataset of Department of City Planning, New York City has been considered. The PLUTO dataset contains land use data at tax lot level for New York City. The dataset has extensive information about the plots of land including geographical location (borough, zip code, address), building class (e.g. school, hotel etc.), plot area, total building floor area, commercial/residential/office/retail floor area, number of buildings, lot frontage and depth, and building age. The dataset has information about 859204 plots present in New York City. The residential plots were removed from consideration and 236978 commercial buildings from the dataset were used to evaluate the method of the present disclosure. Ideally, each building in the ensemble could have a customized incentive. However, for the sake of computational tractability, buildings of the same type and similar size are constrained to have the same DRP and incentive.

Figures 10A, 10B:
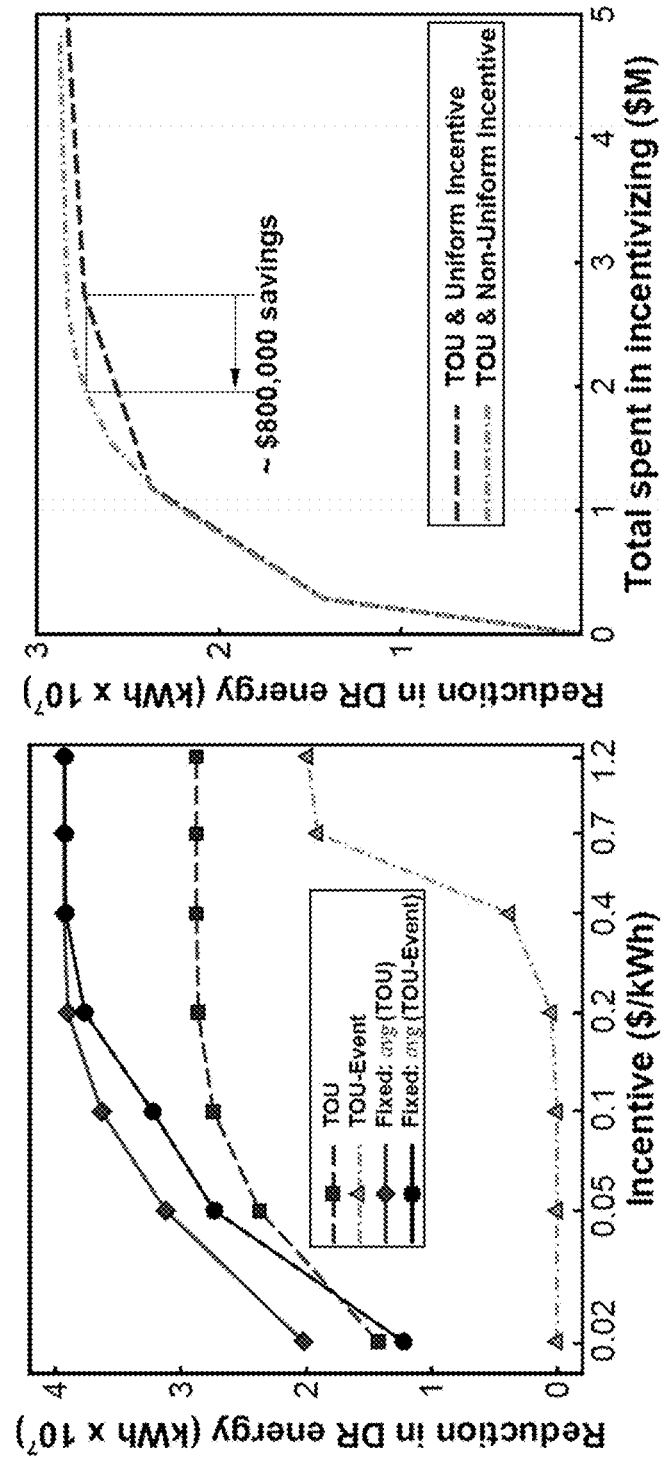
FIG. 10A and FIG. 10B illustrate DR potential for an ensemble of buildings having uniform and non-uniform incentives respectively in accordance with an embodiment of the present disclosure.

Uniform incentive: FIG. 10A illustrates DR potential for an ensemble of buildings having uniform incentives. The X-axis shows the incentive paid; and the Y-axis shows the reduction achieved. The maximum reduction of DR energy possible is about $4 \times 10^7$ kWh. For the price profile TOU, and a reduction of $1.95 \times 10^7$ kWh with respect to the baseline, utility needs to pay a uniform incentive of v=$0.033 per unit of electricity reduced to all building types. As described earlier, for price profiles which have a high max-to-min ratio (due to the baseline optimal operation shifting the load away from the max. price time), the DRP is lower. It is again noted that the DRP for the TOU-Event price profile is least, followed by TOU and the constant price profiles.

Non-uniform incentive: FIG. 10B illustrates DR potential for an ensemble of buildings having non-uniform incentives. The X-axis shows the total incentive offered in dollars across all buildings because the incentive for each building varies. The Y-axis shows the total reduction achieved during the DR window. As a baseline for comparison, the curve for the uniform incentive is also illustrated. Both curves are generated for the TOU price profile alone for the sake of clarity. It may be noted that for high reduction targets, the non-uniform incentive scheme achieves an improvement (e.g. ~$800,000 for reducing $2.74 \times 10^7$ kWh) over the uniform incentive scheme on the PLUTO dataset (for the given day). However, the improvement for smaller targeted reductions is not very significant with the use of non-uniform incentives.

Figure 11A:
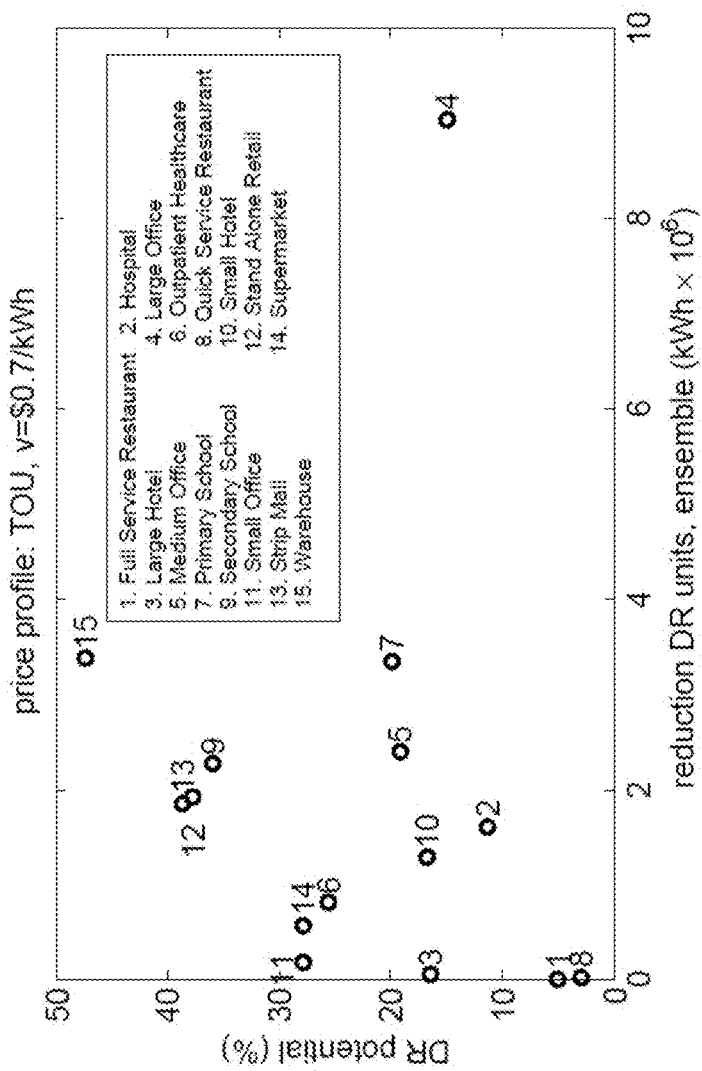
FIG. 11A illustrates reduction in energy during DR for different building types with uniform incentives in accordance with an embodiment of the present disclosure.

Contribution of building types to reduction: Though a building type's DRP might be high in percentage terms relative to its baseline, the baseline itself might be miniscule or the number of buildings of that type could be less. FIG. 11A illustrates reduction in energy during DR for different building types with uniform incentives. The X-axis plots the reduction in the energy during DR achieved for different building types. The Y-axis plots the average DRP in percentage terms across all buildings of that type. Buildings with a low (percentage) DRP (e.g., building type 4—large offices) could contribute significantly to the total demand reduced; and vice-versa (e.g., building type 11—small offices).

Figure 11B:
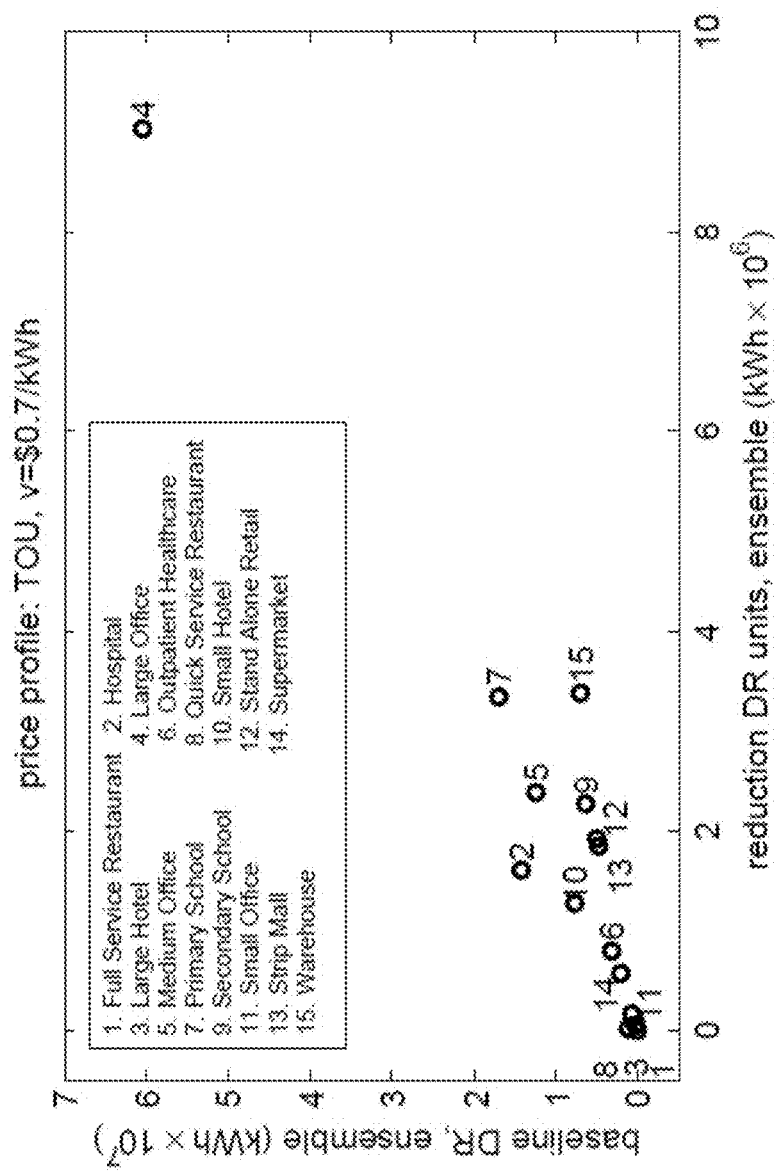
FIG. 11B and FIG. 11C illustrate reduction in energy during DR, for baseline consumption with uniform incentives, and for baseline consumption with non-uniform incentives respectively for different building types in accordance with an embodiment of the present disclosure.
Figure 11C:
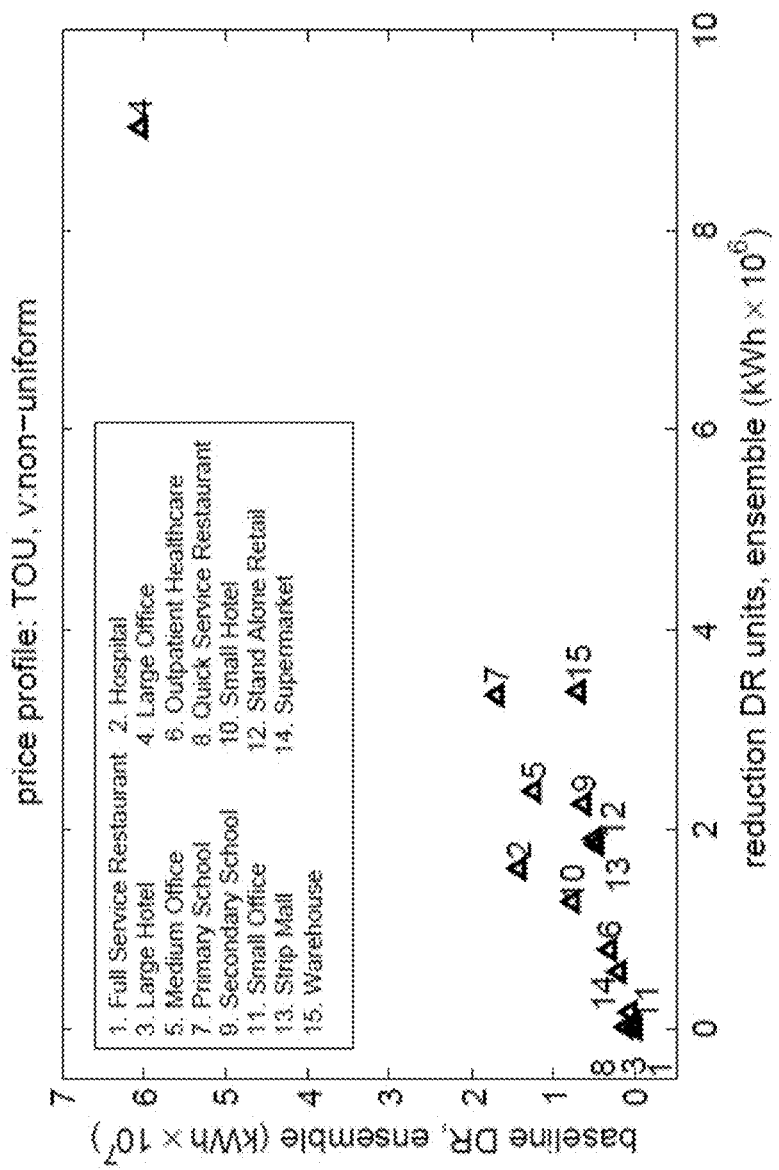

FIG. 11B and FIG. 11C illustrate reduction in energy during DR, for baseline consumption with uniform incentives, and for baseline consumption with non-uniform incentives respectively for different building types. Each building type is represented by a single point. The X-coordinate of a building type's point is the total DR reduction of all buildings of that type. The Y-coordinate of a building type's point is the baseline consumption of all buildings of that type. It may be noted that full and quick service restaurants, large hotel, and small office do not contribute much to the overall DR, while buildings such as large office, primary school, warehouse and medium office are the main contributors. Aggregate energy consumed in the baseline operation for large hotel or small office, is small. So there is no significant reduction by them in the ensemble despite high percentage DRP. For the full/quick service restaurants, the DRP is low and they constitute a small fraction of total energy consumed in the baseline operation. Thus, their contribution to DR is quite low. Such buildings may be excluded by the utility from the DR program. The biggest contributors to DR, namely, large office, primary school, and medium office are the biggest consumers of electricity, owing to the combined effect of their individual baseline consumption and their numbers in the dataset. Inspite of a moderate baseline consumption, relatively larger contribution by warehouses to utility's DR is due to large DR potential of warehouse. This suggests that warehouses should be especially targeted for DR by the utility.

Benefit of DR to the utility: A DR event is triggered to avoid the temporary deficit of supply or costly purchase from electricity spot market. The benefit to the utility maybe quantified as follows. The revenue for the utility R is defined to be the sum of all the energy supplied by the utility weighted by the price of the energy supplied according to the tariff profile. Let the profit margin be $\alpha$. The gross benefit to the utility is thus $\alpha R$. Suppose $\beta$ is the deficit between electricity demand and supply during a DR event and v be the DR incentive. Let x denote the spot-price of electricity during the DR period for the utility. Let y denote the cost of generation of electricity for the utility from its own self-owned sources. Then the increase s in the cost of procuring electricity for the utility is given by x−y. For incentive v, the total reduction achieved by the utility is given by $v = \Sigma_b \text{DRP}_b(v)$ (Equation 2 aggregated over all buildings). That is, for each unit demand reduced, the utility has saved s but spent v as incentive. For the amount $\beta - v$, the utility has no option but to purchase from the spot market at an increased cost of $s \times (\beta - v)$. Therefore the net benefit to the utility is given by $$B_u = (\alpha R - vv - \max(0, s(\beta - v))) \quad \rightarrow (12)$$

Figure 12:
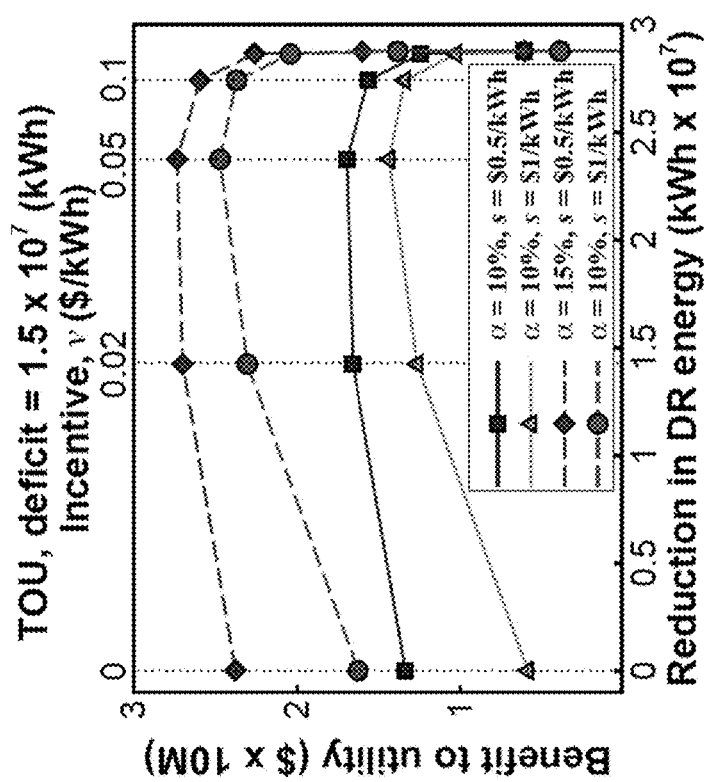
FIG. 12 illustrates net benefit of DR to the utility with TOU price profile and uniform incentivization in accordance with an embodiment of the present disclosure.

FIG. 12 illustrates net benefit of DR to the utility with TOU price profile and uniform incentivization by triggering the DR event (of varying target reductions) for a variety of s and α values for a deficit of $1.5 \times 10^7$ kWh. The X-axis shows total reduction in demand across all buildings, $\Sigma_b$ $DRP_b(v)$. The Y-axis shows the net economic benefit to the utility (Equation 12). For the curve corresponding to α=10% and s=1, FIG. 12 illustrates that triggering the DR event of appropriate size ($2.4 \times 10^7$ kWh by announcing an incentive of v=$0.05/kWh of electricity reduced with respect to the baseline) is economically most profitable to the utility. A much smaller incentive requires a significant amount of electricity to be purchased from the spot market. A much higher incentive results in huge revenue outgo due to incentivization. Both situations are undesirable.

Thus systems and methods of the present disclosure provide a DRP model of a facility that accounts for its constraints and rational response to an incentive. Using the DRP model of a facility, incentive design for a utility was studied over an aggregated set of buildings constituting the facility. From a building's perspective, when using HVAC for DRP, it was found that the building's benefit and therefore its DRP depends on internal heat gains; baseline usage patterns; and intra-day variations in the baseline tariffs. From a utility's perspective, the mix of buildings in its customer base matters more than the DRP of individual buildings. Specifically, even buildings with low DRP can help the utility due to the number of buildings of such type. Finally, it was found that non-uniform incentives offer a scope for better economics, even if implementation might be difficult. The present disclosure may help utilities design an incentive while understanding their customers' requirements and capabilities.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method comprising:
   estimating a demand response potential (DRP) of a facility constituting one or more buildings, for a given tariff structure and demand response (DR) incentive from a utility based on (i) a baseline energy consumption (E*) associated with cost optimal operation of the facility with no DR and (ii) energy consumption ($E_{DR}$*) of the facility with DR, wherein the baseline energy consumption (E*) and the energy consumption ($E_{DR}^*$) of the facility are based on a plurality of constraints, wherein each building includes multiple thermal zones served by one or more Air Handling Unit (AHU) fan and chiller unit, wherein the plurality of constraints indicate thermal comfort requirements of occupants in the one or more buildings, and wherein the plurality of constraints include:
  (i) a dynamic thermal model of the facility to predict temperature evolution given the ambient conditions, internal heat loads and building envelope parameters, wherein the dynamic thermal model uses lumped capacitance models, wherein dynamic thermal model considers (a) ambient heat entering a space inside the building through the building envelop and (b) internal heat loads resulting from occupants, computers and lighting;
  (ii) a Heating Ventilation and Air Conditioning (HVAC) model for AHU fan and chiller unit given the fan mass flow rate and total cooling load respectively; and
  (iii) systemic inertia in HVAC equipment, wherein the systemic inertia in the HVAC equipment effects a time taken by the HVAC equipment to achieve a fully loaded state after being switched on,
  wherein the dynamic thermal model and the HVAC model are generated by minimizing complexity of the building by reducing the multiple thermal zones served by multiple AHU fans and chillers into a single thermal zone, a single AHU, and a single chiller with a single averaged performance curve;
  determining optimal incentive for the facility based on the estimated DRP, wherein optimal incentive for the facility is determined by:
    computing aggregate reduction for the facility based on the estimated DRP of the one or more buildings for each possible value of incentive;
    computing aggregated incentive from the utility as a weighted summation of the estimated DRP of the one or more buildings; and
    assigning non-uniform incentive to the one or more buildings constituting the facility by adjusting the incentives such that the aggregated incentive is minimized and the estimated DRP achieves a target aggregate reduction for the utility; and
  shifting an electrical load of the facility from a DR period to a non-DR period by over-cooling the buildings, based on the estimated DRP and the determined optimal incentives, without reducing comfort requirements of occupants in the one or more buildings during the DR period and the non-DR period, wherein duration of the over-cooling varies based on construction material of the buildings and type of the buildings, wherein the type of the buildings depends on internal heat gain.

2. The processor implemented method of claim 1, wherein the baseline energy consumption (E*) and the energy consumption ($E_{DR}^*$) of the facility with DR are further based on a cost criteria.

3. The processor implemented method of claim 2, wherein the cost criteria for the baseline energy consumption (E*) is associated with total HVAC energy consumption due to AHU fan and chillers and is a function of AHU fan speed for a given time period; and the cost criteria for the energy consumption ($E_{DR}^*$) of the facility with DR is associated with reduction in energy consumption from the baseline energy consumption based on the incentive from the utility and the total HVAC energy consumption associated thereof.

4. The processor implemented method of claim 1, wherein the plurality of constraints are associated with maximum AHU flow rate, thermal comfort requirement, maximum available chiller capacity and temperature evolutions.

5. The processor implemented method of claim 4, wherein the temperature evolutions for given ambient conditions, internal heat loads and building envelope parameters are predicted by the dynamic thermal model.

6. A system comprising:
  one or more data storage devices operatively coupled to one or more hardware processors and configured to store instructions configured for execution by the one or more hardware processors to:
  estimate a demand response potential (DRP) of a facility constituting one or more buildings, for a given tariff structure and demand response (DR) incentive from a utility based on (i) a baseline energy consumption (E*) associated with cost optimal operation of the facility with no DR and (ii) energy consumption ($E_{DR}^*$) of the facility with DR, wherein the baseline energy consumption (E*) and the energy consumption ($E_{DR}^*$) of the facility with DR are based on a plurality of constraints, wherein each building includes multiple thermal zones served by one or more Air Handling Unit (AHU) fan and chiller unit, wherein the plurality of constraints indicate thermal comfort requirements of occupants in the one or more buildings, and wherein the plurality of constraints include:
    (i) a dynamic thermal model of the facility to predict temperature evolution given the ambient conditions, internal heat loads and building envelope parameters, wherein the dynamic thermal model uses lumped capacitance models, wherein dynamic thermal model considers (a) ambient heat entering a space inside the building through the building envelop and (b) internal heat loads resulting from occupants, computers and lighting;
    (ii) a Heating Ventilation and Air Conditioning (HVAC) model for AHU fan and chiller unit given the fan mass flow rate and total cooling load respectively; and
    (iii) systemic inertia in HVAC equipment, wherein the systemic inertia in the HVAC equipment effects a time taken by the HVAC equipment to achieve a fully loaded state after being switched on,
    wherein the dynamic thermal model and the HVAC model are generated by minimizing complexity of the building by reducing the multiple thermal zones served by multiple AHU fans and chillers into a single thermal zone, a single AHU, and a single chiller with a single averaged performance curve;
  determine optimal incentive for the facility based on the estimated DRP, wherein optimal incentive for the facility is determined by:
    computing aggregate reduction for the facility based on the estimated DRP of the one or more buildings for each possible value of incentive;
    computing aggregated incentive from the utility as a weighted summation of the estimated DRP of the one or more buildings; and
    assigning non-uniform incentive to the one or more buildings constituting the facility by adjusting the incentives such that the aggregated incentive is minimized and the estimated DRP achieves a target aggregate reduction for the utility; and
  shift an electrical load of the facility from a DR period to a non-DR period by over-cooling the buildings, based on the estimated DRP and the determined optimal incentives, without reducing comfort requirements of occupants in the one or more buildings during the DR period and the non-DR period, wherein duration of the over-cooling varies based on construction material of the buildings and type of the buildings, wherein the type of the buildings depends on internal heat gain.

7. The system of claim 6, wherein the baseline energy consumption (E*) and the energy consumption ($E_{DR}$*) of the facility with DR are further based on a cost criteria.

8. The system of claim 7, wherein the cost criteria for the baseline energy consumption (E*) is associated with total HVAC energy consumption due to AHU fan and chillers and is a function of AHU fan speed for a given time period; and the cost criteria for the energy consumption ($E_{DR}$*) of the facility with DR is associated with reduction in energy consumption from the baseline energy consumption based on the incentive from the utility and the total HVAC energy consumption associated thereof.

9. The system of claim 6, wherein the plurality of constraints are associated with maximum AHU flow rate, thermal comfort requirement, maximum available chiller capacity and temperature evolutions.

10. The system of claim 9, wherein the temperature evolutions for given ambient conditions, internal heat loads and building envelope parameters are predicted by the dynamic thermal model.

11. A computer program product comprising a non-transitory computer readable medium having a computer readable program embodied therein, wherein the computer readable program, when executed on a computing device, causes the computing device to:
    estimate a demand response potential (DRP) of a facility constituting one or more buildings, for a given tariff structure and demand response (DR) incentive from a utility based on (i) a baseline energy consumption (E*) associated with cost optimal operation of the facility with no DR and (ii) energy consumption ($E_{DR}$*) of the facility with DR; and
    determine optimal incentive for the facility based on the estimated DRP, wherein optimal incentive for the facility is determined by:
        computing aggregate reduction for the facility based on the estimated DRP of the one or more buildings for each possible value of incentive;
        computing aggregated incentive from the utility as a weighted summation of the estimated DRP of the one or more buildings; and
        assigning non-uniform incentive to the one or more buildings constituting the facility by adjusting the incentives such that the aggregated incentive is minimized and the estimated DRP achieves a target aggregate reduction for the utility; and
    shifting an electrical load of the facility from a DR period to a non-DR period by over-cooling the buildings, based on the estimated DRP and the determined optimal incentives, without reducing comfort requirements of occupants in the one or more buildings during the DR period and the non-DR period, wherein duration of the over-cooling varies based on construction material of the buildings and type of the buildings, wherein the type of the buildings depends on internal heat gain;
    wherein the baseline energy consumption (E*) and the energy consumption ($E_{DR}$*) of the facility with DR are based on a plurality of constraints, wherein each building includes multiple thermal zones served by one or more Air Handling Unit (AHU) fan and chiller unit, wherein the plurality of constraints indicate thermal comfort requirements of occupants in the one or more buildings, and wherein the plurality of constraints include:
        (i) a dynamic thermal model of the facility to predict temperature evolution given the ambient conditions, internal heat loads and building envelope parameters, wherein the dynamic thermal model uses lumped capacitance models, wherein dynamic thermal model considers (a) ambient heat entering a space inside the building through the building envelop and (b) internal heat loads resulting from occupants, computers and lighting;
        (ii) a Heating Ventilation and Air Conditioning (HVAC) model for AHU fan and chiller unit given the fan mass flow rate and total cooling load respectively; and
        (iii) systemic inertia in HVAC equipment, wherein the systemic inertia in the HVAC equipment effects a time taken by the HVAC equipment to achieve a fully loaded state after being switched on,
    wherein the dynamic thermal model and the HVAC model are generated by minimizing complexity of the building by reducing the multiple thermal zones served by multiple AHU fans and chillers into a single thermal zone, a single AHU, and a single chiller with a single averaged performance curve.

* * * * *